United States Patent [19]
Jacobsen et al.
[11] Patent Number: 5,012,836
[45] Date of Patent: May 7, 1991

[54] SERVOVALVE APPARATUS FOR USE IN FLUID SYSTEMS

[75] Inventors: Stephen C. Jacobsen; Edwin K. Iversen; David F. Knutti; Clark C. Davis, all of Salt Lake City, Utah
[73] Assignee: Sarcos Group, Salt Lake City, Utah

[21] Appl. No.: 473,301
[22] Filed: Jan. 31, 1990
[51] Int. Cl.[5] ............ G05D 16/20
[52] U.S. Cl. ............ 137/83; 251/129.08
[58] Field of Search ............ 137/83; 91/3; 251/129.08

[56] References Cited
U.S. PATENT DOCUMENTS
2,990,839 7/1981 Ray ............ 137/83 X
3,081,787 3/1983 Medlendyk ............ 137/83

*Primary Examiner*—Alan Cohan
*Attorney, Agent, or Firm*—Thorpe, North & Western

[57] ABSTRACT

A servovalve apparatus for use in fluid systems which comprises an elongate flexible valve element having a fixed end and a free, moveable end, and a conductive coil which surrounds at least a portion of the valve element adjacent its fixed end. An armature is secured to the valve element so as to be adjacent the conductive coil. Two permanent magnets, are provided adjacent the armature on opposite sides thereof, the magnets being positioned such that one magnet presents a north magnetic pole facing the armature and the other magnet presents a south magnetic pole facing the armature. A receiving plate is provided adjacent the free end of the valve element, the receiving plate having one or more channels formed therein for receiving fluid, and a bore for delivering fluid. Preferably, the channels and bore in the receiving plate originate within said communicate with a concave socket in the receiving plate which has substantially the same radius of curvature as the path over which the free end of the valve element moves during flexure. A deflection cup is disposed on the free end of the valve element to move adjacent the surface of the concave socket and selectively redirect fluid from the bore to one of the channels.

12 Claims, 2 Drawing Sheets

SERVOVALVE APPARATUS FOR USE IN FLUID SYSTEMS

BACKGROUND OF THE INVENTION

This invention relates to a novel servovalve apparatus for use in fluid systems to selectively direct or "port" fluid flow.

Fluid systems are frequently used in mechanical devices as a means of controlling or positioning various mechanical components. As used herein, the term "fluid" is used generally to refer to any substance which is capable of flowing under pressure through a conduit. Thus, the term "fluid" encompasses both gasses and liquids, and the general term "fluid systems" is intended to include both pneumatic and hydraulic systems.

A fluid system typically comprises a pump for pressurizing the fluid which is then used to provide the force necessary to position and/or control a desired mechanical component. For example hydraulic systems are often used to control shovels or scoops on heavy construction machinery. Similarly, pneumatic systems are frequently employed in the field of robotics to control the position and movement of a desired object, such as, for example, a robotic arm.

Appropriate fluid controlling valves are essential for the proper operation of virtually all fluid systems. For example, a valve may be used to direct pressurized fluid first to one side and then the other of a plunger which is slideably positioned within an elongated housing. The operation of the valve thus controls the flow of pressurized fluid to each side of the plunger and thereby the position of the plunger within the housing.

Examples of some of the more commonly used valves in fluid systems are poppet valves (which control fluid flow by a "pinching" action) and spool valves (which control fluid flow by selective alignment of fluid channels in a spool with orifices in a sleeve in which the spool is slideably disposed). Poppet valves are generally not well suited for servovalve applications, typically have a significant lag time in their operation, and many times have leakage problems. Spool valves require very tight tolerances to avoid leakage between the spool and sleeve thus making them expensive to manufacture and maintain. Also, because of the tight tolerances, significant frictional forces can be generated causing wear in the valves.

A valve having somewhat more recent origin is the jet pipe valve, often called a flow-dividing valve. A jet pipe valve comprises a fluid pipe having a small orifice on its downstream end. Fluid flows through the pipe at a substantially constant rate, and the small orifice produces a "jet" of fluid out of the end of the pipe. The pipe is provided with a suitable actuator device which selectively directs the fluid jet toward one or more nearby fluid paths. By appropriately positioning the fluid pipe, the ratio of fluid flowing into the nearby fluid paths can be controlled.

Conventional jet pipe valves suffer from significant fluid leakage and are quite inefficient in their use of fluid power. The operation of jet pipe valves is also somewhat unpredictable, and can be unstable, at high pressures and high fluid flow rates. Consequently, prior art jet pipe valves typically incorporate small orifices (less than 0.005") and operate at fluid flow rates on the order of 0.1 gallons per minute. Conventional jet pipe valves are also typically quite bulky. Due to the significant tangential forces present in jet pipe valves, bulky mechanical actuators are often used. Torsional springs and other balancing mechanisms are also often employed in jet pipe valves in an effort to improve valve operation. Consequently, prior art jet pipe valves are often very difficult to properly maintain and adjust during use.

SUMMARY OF THE INVENTION

It is an object of the invention to provide a servovalve apparatus for use in fluid systems and capable of providing high power output.

It is also an object of the invention to provide such a system capable of operating stably under high fluid flow rates but which does not require the maintenance of tight tolerances between the valve's component parts.

It is an additional object of the invention to provide a substantially frictionless-operating servovalve apparatus.

It is another object of the invention to provide a servovalve apparatus in which fluid flow forces are reduced.

It is still another object of the invention to provide an efficient servovalve apparatus for use in fluid systems which is simple in construction and inexpensive to manufacture and maintain.

It is a further object of the invention to provide a servovalve apparatus for use in fluid systems which is both lightweight and compact in size.

In accordance with the foregoing objects, one illustrative embodiment of the present invention comprises an elongate flexible valve stem or element having a fixed end and a free end which is moveable back and forth along a generally arcuate path. A receiving plate is provided to define a generally arcuate surface area adjacent the arcuate path over which the free end of the valve element moves. The receiving plate has a bore formed therein for directing a fluid stream toward the free end of the valve element, and at least one fluid channel terminating at a location along the arcuate surface area. A porting element is disposed on the free end of the valve element to guide or port the fluid stream from the bore into the fluid channel when the free end is deflected or moved to a certain position over the receiving plate. Apparatus for selectively deflecting the free end of the valve element to the said certain position (and out of said certain position) is also provided.

The apparatus for selectively deflecting the free end of the valve element could, in accordance with one aspect of the invention, include an armature affixed to the valve element near the free end thereof, a conductive coil which surrounds at least a portion of the valve element adjacent its free end, and a magnet assembly disposed adjacent the armature on at least one side thereof. A source of electrical current supplies current to the conductive coil to magnetize the armature and thus cause it to either be attracted toward or repelled from the magnet assembly. In this manner, the porting element may be selectively positioned over the fluid channel in the receiving plate or moved away therefrom.

These and other objects and features of the present invention will become more fully apparent from the following description and appended claims, taken in conjunction with the accompanying drawings.

DETAILED DESCRIPTION OF THE PREFERRED EMBODIMENTS

The presently preferred embodiments of the invention will be best understood by reference to the drawings, wherein like parts are designated with like numerals throughout.

Figure 1:
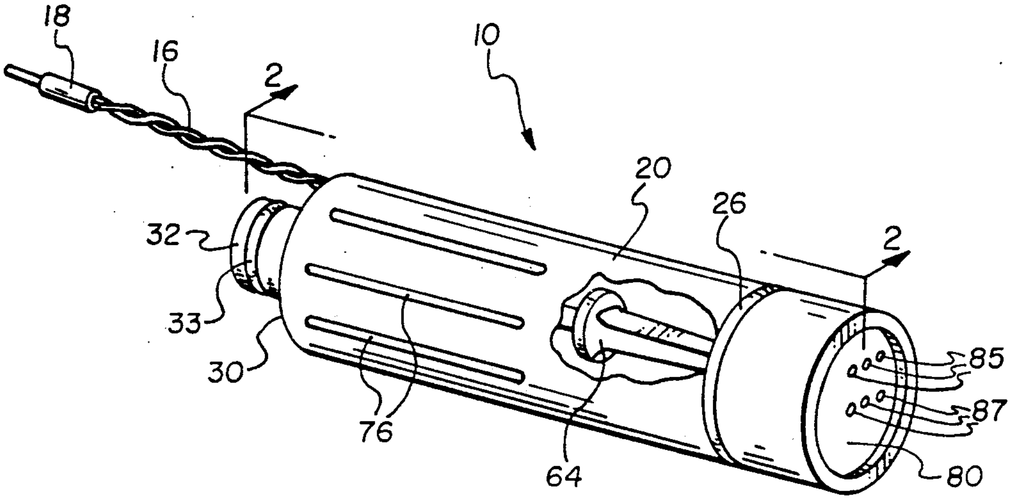
FIG. 1 is a perspective partially cutaway view of one presently preferred embodiment of the servovalve apparatus of the present invention.
Figure 2:
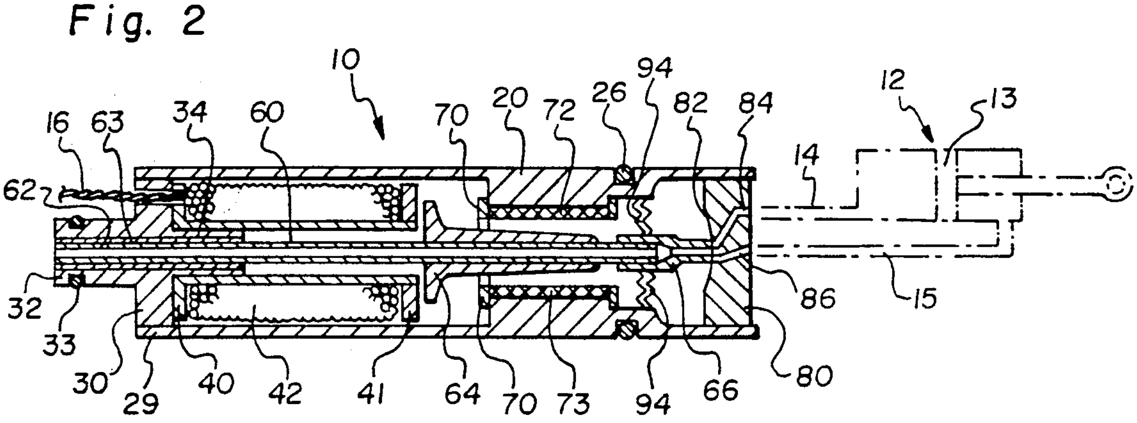
FIG. 2 is vertical cross-sectional view of the embodiment of FIG. 1 taken along lines 2—2 of FIG. 1 which also includes a schematic illustration of an actuator device shown in broken lines.

One presently preferred embodiment of the servovalve apparatus of the present invention, designated generally at 10, is illustrated in FIGS. 1 and 2. As shown, servovalve 10 comprises a body 20 which may be formed of any suitable material. It is presently preferred that body 20 be formed of a soft magnetic material which is easy to machine and which has low hysteresis, such as, for example, silicon steel, leaded steel, or low carbon steel.

While body 20 could have a wide variety of different shapes and configurations, body 20 is illustrated herein as being substantially cylindrical. It is presently believed that the cylindrical configuration of body 20 facilitates the manufacture of servovalve 10, and is readily susceptible of being machined to accommodate the various component parts of servovalve 10, as described further below.

The upstream end 29 of body 20 is provided with an end plate 30, as illustrated in FIG. 2. End plate 30 may be formed of any suitable material, such as, for example, brass. End plate 30 is secured within the upstream end 29 of body 20 in some suitable manner such as by soldering or by means of an adhesive.

End plate 30 is provided with a nipple 32, as shown, which may be attached to a source of pressurized fluid using a conventional fluid tube (not shown). An O-ring 33 preferably surrounds nipple 32 in a suitable groove to assist in sealing nipple 32 to the fluid tube.

Opposite nipple 32, end plate 30 is provided with a spindle 34. Spindle 34 and nipple 32 may advantageously be formed as an integral part of end plate 30. Significantly, nipple 32, end plate 30, and spindle 34 each have a bore therethrough which combine to form a substantially uniform, longitudinal passageway, the purpose of which will become more readily apparent from the discussion which follows.

A mandrel 40 is provided on spindle 34 of end plate 30. Mandrel 40 may be formed of any suitable material such as, for example, steel, and could be formed as an integral part of end plate 30 or as a separate element. A downstream end disk 41 of the mandrel is made of a non-magnetic material such as aluminum, plastic, etc. The mandrel 40 will be further discussed hereafter.

A suitable electrical conductor is wound around mandrel 40 so as to form a conductive coil. Any suitable electrical conductor may be used, such as, for example, #30 copper magnet wire. The ends of wire 42 are then connected to suitable insulated wires 16 which pass out of body 20 through a suitable opening in end plate 30. As shown in FIG. 1, wires 16 may be provided with some type of connector plug 18 for connecting wires 16 (and thus conductive coil 42) to a suitable source of electric current.

As illustrated in FIG. 2, a flexible conduit 60 passes through the central bore of end plate 30 and the central bore of the mandrel 40. The upstream end 62 of conduit 60 is secured within end plate 30 in some appropriate manner, such as, for example, by means of a conventional bushing 63. Conduit 60 may be formed of any suitable material, such as, for example, steel.

An armature 64 is secured to conduit 60 so as to lie adjacent mandrel 40. Armature 64 may, for example, be formed of steel and may be slideably secured on conduit 40 by friction or by being soldered. Alternatively, armature 64 may be secured on conduit 60 by means of a suitable adhesive.

Armature 64 may have virtually any suitable geometric configuration. For example, armature 64 may be a substantially rectangular member as best seen in FIG. 1. It is presently preferred that a portion of armature 64 near mandrel 40 be diametrically enlarged, as shown in FIGS. 1 and 2. It is believed that the diametrically enlarged portion of armature 64 will assist the armature in conducting the magnetic induction current necessary for the proper operation of servovalve 10, as described in more detail below.

Two magnets 72 and 73 are positioned on opposite sides of armature 64, as shown in FIG. 2. Magnets 72 and 73 may, for example, be secured to body 20 by means of suitable magnet mounts 70. Significantly, one magnet 72 or 73 is configured and positioned such that it presents a north magnetic pole facing armature 64, while the other such magnet is configured and positioned so as to present a south magnetic pole facing armature 64. While magnets 72 and 73 could be formed of a wide variety of different materials, it is presently preferred that magnets 72 and 73 be formed of a rare earth metal material. It is believed that rare earth magnets facilitate making servovalve 10 small and lightweight due to their superior magnetic characteristics.

The downstream end of conduit 60 is preferably provided with a tip 66 which may be formed of any suitable material, such as, for example, brass. Tip 66 is secured to conduit 60 in some suitable manner, such as by means of friction or by means of a suitable adhesive. Importantly, tip 66 is configured as a fluid orifice through which fluid may flow from conduit 60.

The downstream end of body 20 is provided with a receiving plate 80 which may, for example, be formed of brass. Receiving plate 80 is secured within body 20 in some appropriate fashion, such as by means of solder or adhesive.

Receiving plate 80 has one or more fluid channels or sets of channels 84 and 86 formed therein which terminate in openings 85 and 87, respectively (see FIG. 1). Channels 84 and 86 advantageously originate within and communicate with an arcuate or concave socket 82 which is formed in the surface of receiving plate 80 inside body 20. Preferably, the radius of curvature of socket 82 is substantially equal to the radius of curvature of the arcuate pathway over which the downstream end of conduit 60 moves during flexure, for reasons which will become more fully apparent from the discussion which follows.

Although there will generally be some distance between tip 66 and receiving plate 80, it is preferable to minimize this distance in order to reduce the amount of fluid leakage from between tip 66 and receiving plate 80. The distance between tip 66 and receiving plate 80 is not so small, however, that substantial frictional forces between the tip 66 and receiving plate 80 are present or that a lubricating fluid must be used in servovalve 10. Significantly, by providing receiving plate 80 with a socket 82, as described above, the distance between tip 66 and receiving plate 80 can also be maintained at a substantially constant minimal level during flexure of conduit 60.

When used in a fluid system, servovalve 10 is attached by means of nipple 32 to a source of pressurized fluid. The pressurized fluid then enters conduit 60 through nipple 32 and travels toward receiving plate 80.

Conductive coil 42 is connected by means of wires 16 and plug 18 to a source of electricity. As electrical current flows through coil 42, a magnetic current is induced through the center of coil 42 in accordance with well-known principles of electromagnetism. Because of this induced magnetic current, armature 64 which is adjacent one end of coil 42 will be magnetized as either a north magnetic pole or a south magnetic pull depending upon the direction of the electrical current in coil 42. As a result, armature 64 will be magnetically attracted toward either magnet 72 or magnet 73, and conduit 60 will be deflected either upwardly or downwardly in FIG. 2.

For example, the direction of the electrical current through coil 42 may cause armature 64 to be magnetized as a north magnetic pole. Thus, if magnet 72 is positioned so as to present a north magnetic pole facing armature 64 and magnet 73 is positioned so as to present a south magnetic pole facing armature 64, armature 64 will be magnetically repelled from magnet 72 and magnetically attracted toward magnet 73. As a result, conduit 60 will be deflected downwardly in FIG. 2. Conduit 60 could, of course, also be deflected upwardly in FIG. 2 in a similar fashion by simply reversing the direction of the electrical current in coil 42.

As a result of supplying electrical current to the coil 42 to develop magnet flux, eddy currents in the flux pathway are also developed, e.g., in the body 20 and mandrel 40, and any other conductive material located in the flux pathway. Such eddy currents produce a back electromotive force which slows buildup of the flux and thus the response time of the servovalve. In order to interfere with and disrupt the production of such eddy currents, elongate slots 76 (FIG. 1) are formed in the body 20 to extend generally parallel to the longitudinal axis of the body 20 and to one another. These slots 76 serve to breakup the pathways over which the eddy currents would otherwise develop.

Figure 5:
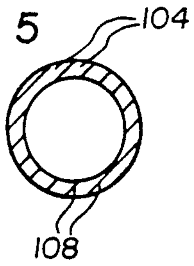
FIG. 5 is an end, cross-sectional view of the mandrel of the apparatus of FIGS. 1 and 2.

An additional feature employed for disrupting the formation of eddy currents is to construct the mandrel 40 in laminate form, with laminations of conductive material 104 (FIG. 5 shows an end cross-sectional view of the mandrel 40) separated by layers or coatings 108 of nonconductive material. The coatings 108 of nonconductive material breakup the pathways of the eddy currents to inhibit their formation.

It will be readily appreciated that if conduit 60 is deflected upwardly in FIG. 2, fluid will flow through conduit 60 and through tip 66 into fluid channels 84. On the other hand, if conduit 60 is deflected downwardly in FIG. 2, fluid will flow through conduit 60 and through tip 66 into channels 86. Thus, the flow of fluid into fluid channels 84 and 86 may be selectively controlled by simply controlling the direction of the electrical current in coil 42 which determines the direction conduit 60 is deflected.

Advantageously, as mentioned above, by providing receiving plate 80 with a concave socket 82 which has a radius of curvature substantially equal to the radius of curvature of the pathway over which the downstream end of conduit 60 moves, a relatively close tolerance can be maintained between tip 66 and concave socket 82. As a result, the flow of fluid through conduit 60 can be virtually stopped by positioning conduit 60 as illustrated in FIG. 2 such that the orifice (or orifices) formed by tip 66 lie between fluid channels 84 and 86. While some fluid leakage can still be expected, the fluid leakage will be minimal as compared with prior art jet pipe valves. In fact, the performance of servovalve 10 can approach that of conventional spool valves while being much less expensive and much easier to manufacture and maintain.

As noted above, there will likely be at least some fluid which leaks into the interior of body 20 from the orifice (or orifices) formed by tip 66. Such fluid may occasionally contain magnetized particles which could travel toward magnets 72 and 73 and become affixed thereto. It will be readily appreciated that such a condition could have a significant adverse effect upon the performance of servovalve 10.

In order to prevent magnetic particles from coming into contact with magnets 72 and 73, an appropriate filter may be provided around tip 66. For example, a conventional porous metal material may be provided around tip 66 to act as a filter for any magnetized particles in the fluid. Alternatively, a metal bellows 94 may be provided between body 20 and tip 66. Bellows 94 will still allow tip 66 to move within body 20, but will prevent any fluid from coming into contact with magnets 72 and 73.

Unlike many prior art devices, the fluid used in servovalve 10 may be virtually any fluid, including both air and water. However, if water is used, it also becomes important to insulate coil 42 from contact with the water. The use of a bellows 94 as could thus also serve to insulate coil 42 from water.

As shown schematically in FIG. 2, servovalve 10 may be connected to a suitable actuator 12, if desired. Thus, by directing fluid through channel 84 in receiving plate 80, the pressurized fluid can be directed through channel 14 so as to cause extension of piston rod 13 of actuator 12. Fluid could thereafter be directed through channel 86 in receiving plate 80 to channel 15 which would cause piston rod 13 to be retracted.

Advantageously, an actuator 12 may be connected directly to servovalve 10 by means of a suitable sleeve (not shown). In such case, in order to facilitate sealing the sleeve around the downstream end 28 of body 20, an O-ring 26 may be provided around body 20, as shown.

Figure 3:
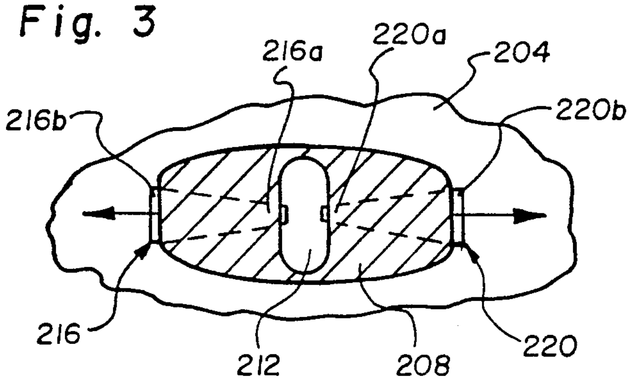
FIG. 3 is a top, graphical view of a tip and receiving plate configuration for use with the apparatus of FIGS. 1 and 2.

FIG. 3 shows a top, graphical view of one embodiment of a receiving plate 204 and a tip 208 for more gradually increasing fluid flow from an orifice 212 in the tip into either channel 216 or channel 220, formed in the receiving plate 204, depending upon the direction of deflection of the tip 208. The channels 216 and 220 are formed with generally wedge-shaped cross-sections, as shown, with the narrower ends 216*a* and 220*a* being positioned nearest to one another, with the respective channels extending in opposite directions therefrom, again as shown. The tip 208 is dimensioned so that a small portion of the narrower ends 216*a* and 220*a* of the channels are exposed to the orifice 212, and so that the tip leaves uncovered small portions of the wider ends 216*b* and 220*b* are left uncovered by the tip. With this configuration, a small amount of fluid would flow continually from the orifice 212 into the channels 216 and 220 when the tip 208 is in an undeflected position (midway between the two channels). As the tip 208 is deflected either to the left or right in FIG. 4, it is evident that the exposure of the channels to the orifice 212 takes place gradually as the channel in question widens in the direction of movement of the tip. The fluid flow thus gradually increases from a trickle to the full amount desired. The effect of this is that the tip 208 can be more stably controlled and moved. When fluid flow begins abruptly, such as in conventional jet pipe valve arrangements, the end of the jet pipe can become unstable and vibrate or oscillate (such condition is known as flow force instability). With the configuration of FIG. 4, the likelihood of such instability is reduced.

Figure 4:
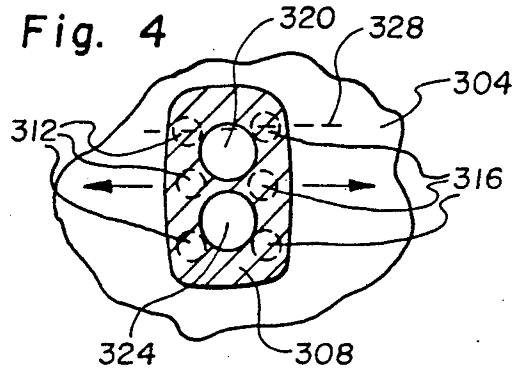
FIG. 4 is a top, graphical view of another alternative tip and receiving plate configuration for use with the apparatus of FIGS. 1 and 2.

FIG. 4 shows a top, graphical view of an alternative configuration for a receiving plate 304 and tip 308. Here, the receiving plate 304 has two rows of three channels, 312 and 316 formed therein.

The two rows of channels 312 and 316 are arranged generally parallel to one another and perpendicular or cross-wise to the direction of movement or deflection of the tip 308 indicated by the arrows in FIG. 4. The tip 308 includes two orifices 320 and 324 positioned in a row midway between the two rows of channel 312 and 316, and offset from imaginary lines (such as line 328) joining adjacent channels of the two rows 312 and 316 (such as the top two adjacent channels). Again, it may be desirable to provide some overlap of the orifices 320 and 324 with adjacent channels 312 and 316 so that some fluid flow occurs even when the tip 308 is in the undeflected position. As with the FIG. 3 configuration, the arrangement of FIG. 4 likewise allows for a gradual increase in the flow of fluid upon deflection of the tip 308 (either to the right or left in FIG. 4). That is, the flow forces otherwise generated or, to a certain extent, moderated so that the likelihood of flow force instability is reduced.

Figure 6:
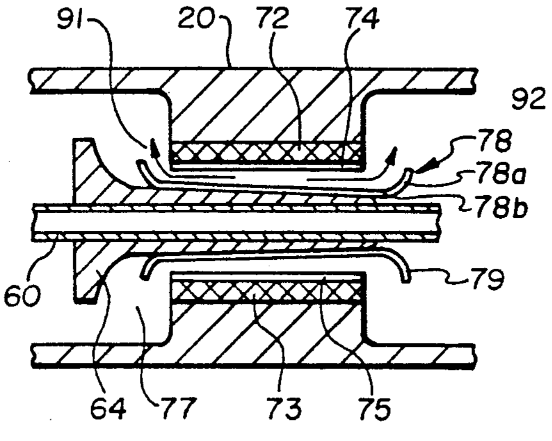
FIG. 6 is a cross-sectional view of an alternative arrangement of the armature and magnets of the servovalve apparatus of FIGS. 1 and 2.

FIG. 6 is a side, cross-sectional view of an alternative arrangement of the armature 64 and magnets 72 and 73 shown in FIG. 2. In this arrangement, a layer or plate of nonmagnetic material 74 and 75 (such as aluminum, plastic, etc.) disposed respectively over magnets 72 and 73. The effect of these layers 74 and 75 is to decrease the gap between the armature 64 and the respective magnets 72 and 73 to thereby produce a smaller pathway through which damping fluid (which might simply be air) may escape. The effect of this is to increase the damping, because of the close proximity of the armature 64 to the layers 74 and 75, with movement of the armature. Further damping can be obtained by providing damping pans 78 and 79, each having sidewalls and a bottom wall such as side walls 78*a* and bottom wall 78*b*, on the armature 60 to face and partially circumscribe corresponding layer 74 and magnet 72, and layer 75 and magnet 72. As the armature 60 is deflected, for example toward layer 74 and magnet 72, the damping fluid located in the cavity 77 must be moved out of the pan 78 as the pan approaches the layer 74 and magnet 72. In order to get out of the way, the damping fluid is caused to flow from between the bottom of the pan 78 and the layer 74 outwardly as indicated by arrows 91 and 92, and since there is some resistance to the movement of this fluid, the movement of the armature towards layer 74 is dampened. Such damping helps to inhibit oscillation of the armature 64 which might otherwise be caused by the flow forces of the fluid through the conduit 60 and into selected receiving channels.

Figure 7:
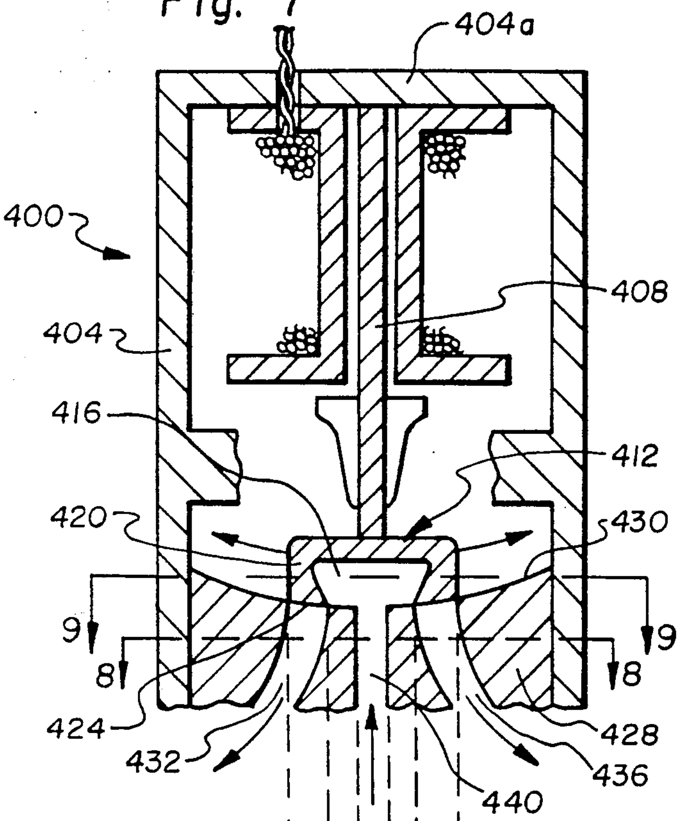
FIG. 7 is a cross-sectional view of another presently preferred embodiment of the servovalve apparatus of the present invention.

FIG. 7 is a cross-sectional view of another embodiment of a servovalve 400 made in accordance with the present invention, showing primarily only those features which are different from the embodiment of FIGS. 1 and 2. The servovalve 400 includes a casing 404 in which are contained a mandrel and coil (not shown) surrounding a valve stem or element 408 which extends forwardly from the back wall 404*a* of the casing. The valve element 408 is an elongate rod made of a flexible and resilient material similar to the conduit 60 of FIGS. 1 and 2. Advantageously, the casing 404 and valve element 408 are made of a material having substantially the same thermal coefficient of expansion so that any change in temperature which would tend to change the long dimensions of the casing 404 would also tend to correspondingly change the length of the valve element 408 so that the close tolerance is designed into servovalve 400 or maintained.

Mounted on the end of the valve element 408 is a porting cup 412 having an interior hollow 416 circumscribed by side walls 420 which terminate in a cup rim 424. The width of the hollow 416 increases with increasing depth in the porting cup 412. That is, the width of the hollow 416 at the rim 424 is less than the width of the bottom of the hollow.

Disposed adjacent to the porting cup 412 is a receiving plate 428 having an arcuate surface area 430 adjacent to which the porting cup 412 moves when deflected. The receiving plate 428 includes two fluid channels 432 and 436 positioned on opposite sides of an input fluid orifice 440. The fluid stream, which in the embodiment of FIGS. 1 and 2 was carried in a conduit 60, is directed by the orifice 440 and the receiving plate 428 toward the porting cup 412. Of course, the orifice 440 would be connected to a suitable source of fluid under pressure. The fluid channels 432 and 436 likewise would be coupled to a suitable actuation device as shown in FIG. 2.

When in the undeflected position shown in FIG. 7, a fluid stream carried in the orifice 440 would be blocked by the porting cup 412. But when the valve element 408 and porting cup 412 are deflected (either to the left or right in FIG. 7) the fluid stream carried in the orifice 440 is guided or ported from the orifice into one of the channels 432 or 436. With the shape of the hollow 416 shown in FIG. 7 and described above, fluid flow forces are moderated so that flow force instability of the porting cup 412 is reduced.

Figure 8:
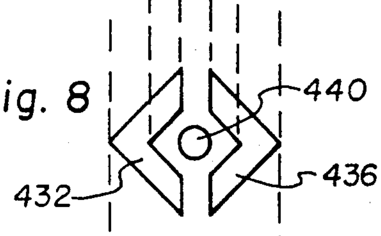
FIG. 8 is a top, cross-sectional view of the channel configuration of the receiving plate of the apparatus of FIG. 6 taken along lines 8—8 of FIG. 7.
Figure 9:
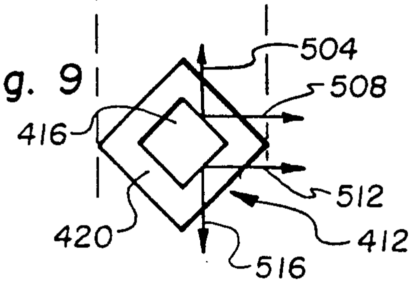
FIG. 9 is a top, cross-sectional view of the porting element of the apparatus of FIG. 7 taken along lines 9—9 of FIG. 7.

Also aiding in reducing flow force instability in the embodiment of FIG. 7 is the top cross-sectional shape of both the porting cup 412 and the channels 432 and 436. A cross-sectional view of the channels 432 and 436, and of the orifice 440, taken along lines 8—8 of FIG. 7 is shown in FIG. 8. A cross-sectional view of the porting cup 412 taken along lines 9—9 of FIG. 7 is shown in FIG. 9. As indicated in FIG. 8, the cross-sections of the two channels 432 and 436 are shaped as facing, right-angle openings on either side of the orifice 440. The top, cross-sectional configuration of the porting cup 412 is generally rectangular as shown in FIG. 9 so that when the porting cup is in the undeflected position, the rim 424 of the side wall 420 substantially covers the channel openings 432 and 436. When the porting cup 412 is deflected to either side, the fluid stream enters the hollow 416 to apply a force to the inside surface of the side wall 420. These forces are illustrated in FIG. 9 with arrows 504, 508, 512 and 516. The forces represented by arrows 504 and 516 cancel leaving only the forces represented by arrows 508 and 512 which are in the direction of deflection of the porting cup 412. If the angle between the side wall sections on which the force arrows are shown in FIG. 9 is made even smaller, than the forces represented by arrows 504 and 516 would increase, but still cancel, and the forces represented by arrows 508 and 512 would decrease. But the smaller forces in the direction of deflection of the porting cup 412 would thus result in a reduction of flow force instability. In any case, it can be seen that with the configuration of the porting cup 412 as shown in FIG. 9 and the angular positions of different sections of the side wall 420 relative to one another, flow force instability can be reduced.

From the above discussion, it will be appreciated that the present invention provides a servovalve apparatus which can readily be used with high fluid flow rates and which can provide relatively high power output but which does not require the very tight tolerances of many prior art valve devices. It has, for example, been found that the servovalve apparatus of the present invention may easily be used with fluid flow rates within the range of from approximately one gallon per minute to approximately four gallons per minute. This is ten to forty times greater than the fluid flow rates typically used with conventional jet pipe valves.

Since tight tolerances are not required in the servovalve apparatus of the present invention, the servovalve apparatus is relatively inexpensive, and it is much easier to manufacture and maintain than many conventional valves. Also, friction and the wear that can result therefrom when tight tolerances are required is avoided with the present invention. At the same time, however, the performance of the servovalve apparatus of the present invention approximates in many respects the performance of much more expensive, conventional spool valves.

The physical configuration of the servovalve apparatus of the present invention also makes it possible to construct the servovalve apparatus much smaller than many conventional valves. The small size and relatively light weight of the servovalve apparatus is also achieved in part due to the use of rare earth magnets within the servovalve apparatus.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A servovalve apparatus for use in fluid systems, comprising a hollow, substantially cylindrical casing made of a magnetic material and having a plurality of slots formed to extend generally parallel with the longitudinal axis of the casing, an elongate, flexible valve element positioned within the cylindrical casing so as to be substantially coaxial with the longitudinal axis of the casing, the valve element having a fixed end and a free end and being made of a material having a thermal coefficient of expansion substantially the same as that of the material from which the casing is made, a mandrel surrounding at least a portion of the valve element adjacent its fixed end, an electrical conductor wound around the mandrel so as to form a conductive coil, an armature affixed to the valve element near the free end thereof, a first magnet and a second magnet positioned on substantially opposite sides of the valve element, the first magnet being positioned such that a north magnetic pole faces the armature and the second magnet being positioned such that a south magnetic pole faces the armature, a receiving plate positioned adjacent the free end of the valve element, the receiving plate having at least one fluid channel formed therein, and a porting element secured to the free end of the valve element for porting a fluid stream received by the porting element into the fluid channel.

2. A servovalve apparatus as defined in claim 1 further comprising means for preventing magnetic particles from coming into contact with the first and second magnets.

3. A servovalve apparatus as defined in claim 1 wherein the mandrel is constructed of laminates of conductive material, with the joined surfaces of the laminates being coated with a nonconductive coating, said laminates extending from one end of the mandrel to the other end.

4. A servovalve apparatus for use in fluid systems in controlling the flow of a fluid stream comprising a flexible conduit having an upstream end and a downstream end which is deflectable along a generally arcuate path from a null position to a first or second position on either side of the null position, means for connecting a source of fluid to the upstream end of the conduit, a receiving plate which defines a generally arcuate surface area adjacent to the arcuate path, said receiving plate having two generally parallel rows of fluid channels with generally circular cross-sections and terminating in the arcuate surface area, said rows positioned generally cross-wise to the arcuate surface area and to the direction of deflection of the downstream end of the conduit, tip means disposed on the downstream end of the conduit and formed with a plurality of orifices normally disposed adjacent to the arcuate surface area between the two rows of channels when the conduit is in the null position, with said orifices normally being positioned offset from an imaginary line joining arcuately adjacent channels of each row, and means for selectively deflecting the downstream end of the conduit to the first position or second position to thereby selectively direct fluid flowing through the conduit to one row of channels or the other.

5. Apparatus as in claim 4 wherein said orifices in the tip partially overlap the respective closest channel openings in the arcuate surface area.

6. Apparatus as in claim 4 wherein said deflecting means comprises a conductive coil surrounding at least a portion of the conduit adjacent its upstream end for receiving electrical current, an armature affixed to the conduit near its downstream end, and a magnet assembly positioned at one side of the armature for selectively attracting or repelling the armature to deflect the conduit, depending upon the direction of electrical current received by the coil.

7. Apparatus as in claim 6 wherein said magnet assembly comprises a first magnet and a second magnet, said first and second magnets being positioned on substantially opposite sides of the conduit, the first magnet being positioned such that a north magnetic pole faces the armature and the second magnet being positioned such that a south magnetic pole faces the armature.

8. Apparatus as in claim 7 further comprising first and second pans disposed on the armature in facing relationship with the first and second magnets, said pans each having a bottom wall and sidewalls which at least partially circumscribe a corresponding magnet.

9. Apparatus as in claim 6 wherein the conductive coil comprises a mandrel surrounding at least a portion of the conduct adjacent its upstream end; and an electrical conductor wound around the mandrel so as to form a conductive coil.

10. Apparatus as in claim 9 wherein the mandrel is constructed of laminates of conductive material, with nonconductive material disposed between the laminates, said laminates extending from one end of the mandrel to the other end.

11. Apparatus as in claim 6 further comprising means for preventing magnetic particles from coming into contact with the magnet assembly.

12. Apparatus as in claim 11 wherein the means for preventing magnetic particles from coming into contact with the magnet assembly comprises a bellows positioned between the downstream end of the conduit and the magnet assembly.

* * * * *